(12) United States Patent
Reichert et al.

(10) Patent No.: US 10,160,400 B2
(45) Date of Patent: Dec. 25, 2018

(54) LASER SCANNING DEVICE FOR MOUNTING ON THE ROOF RACK OF A VEHICLE

(75) Inventors: Rainer Reichert, Horn (AT); Thomas Fälbl, Horn (AT); Johannes Riegl, Trabenreith (AT); Martin Pfennigbauer, Tulln (AT)

(73) Assignee: RIEGL LASER MEASUREMENT SYSTEMS GMBH, Horn (AT)

( * ) Notice: Subject to any disclaimer, the term of this patent is extended or adjusted under 35 U.S.C. 154(b) by 1239 days.

(21) Appl. No.: 13/391,955

(22) PCT Filed: Jul. 30, 2010

(86) PCT No.: PCT/AT2010/000280
§ 371 (c)(1),
(2), (4) Date: Feb. 23, 2012

(87) PCT Pub. No.: WO2011/022741
PCT Pub. Date: Mar. 3, 2011

(65) Prior Publication Data
US 2012/0169876 A1    Jul. 5, 2012

(30) Foreign Application Priority Data
Aug. 28, 2009   (AT) .................... 1355/2009

(51) Int. Cl.
*H04N 7/18* (2006.01)
*B60R 11/04* (2006.01)
(Continued)

(52) U.S. Cl.
CPC ............ *B60R 11/04* (2013.01); *G01C 15/002* (2013.01); *G01S 7/4813* (2013.01); *G01S 17/42* (2013.01);
(Continued)

(58) Field of Classification Search
CPC ........ H04N 5/247; H04N 7/18; G01S 17/023; G01S 17/936; G01S 13/867;
(Continued)

(56) References Cited

U.S. PATENT DOCUMENTS 3,689,695 A * 9/1972 Rosenfield ................ B60R 1/00
348/148
4,645,320 A * 2/1987 Muelling ................ B60R 11/04
352/132
(Continued)

FOREIGN PATENT DOCUMENTS

CA    2198294     8/1997
DE    91 10 846.2  1/1992
(Continued)

OTHER PUBLICATIONS

Eyeballing Google Street Spy published at http://frank.geekheim.de/?p=406 on Jul. 7, 2008 by Frank.*
(Continued)

*Primary Examiner* — Deirdre L Beasley
(74) *Attorney, Agent, or Firm* — Hoffmann & Baron, LLP

(57) ABSTRACT

The invention relates to a laser scanning device for mounting on the roof rack of a vehicle, comprising a base support, which is configured as an "X", can be mounted on a roof rack and on which a laser scanning module that spans the fork of the "X" can be fixed.

20 Claims, 4 Drawing Sheets

(51) Int. Cl.
*G01C 15/00* (2006.01)
*G01S 17/42* (2006.01)
*G01S 17/89* (2006.01)
*G01S 7/481* (2006.01)
*B60R 11/00* (2006.01)

(52) U.S. Cl.
CPC ......... *G01S 17/89* (2013.01); *B60R 2011/004* (2013.01)

(58) Field of Classification Search
CPC ..... G01S 13/931; G01S 13/865; B60R 11/04; B60R 2011/004; G01C 15/002
USPC .................................................. 348/148, 149
See application file for complete search history.

(56) References Cited

U.S. PATENT DOCUMENTS

| | | | | |
|---|---|---|---|---|
| 5,926,117 | A * | 7/1999 | Gunji | G01S 19/04 340/988 |
| 6,917,693 | B1 * | 7/2005 | Kiridena | B60R 1/00 348/E7.086 |
| 7,789,356 | B1 * | 9/2010 | Jones | F16M 11/16 248/178.1 |
| 7,834,910 | B2 * | 11/2010 | DeLorme | G03B 41/00 348/218.1 |
| 8,137,008 | B1 * | 3/2012 | Mallano | B60R 11/04 396/427 |
| 8,200,847 | B2 * | 6/2012 | LeBeau | G01C 21/265 701/300 |
| 8,457,881 | B2 * | 6/2013 | Ishihara | G01C 21/26 348/148 |
| 8,589,014 | B2 * | 11/2013 | Fairfield | G05D 1/024 701/28 |
| 8,866,906 | B1 * | 10/2014 | Abad | B60R 1/00 348/143 |
| 2001/0004777 | A1 * | 6/2001 | Hernandez | A47C 19/025 5/200.1 |
| 2008/0035689 | A1 * | 2/2008 | Murray | B60R 9/08 224/310 |
| 2008/0149002 | A1 * | 6/2008 | Gardner | A47B 3/08 108/6 |
| 2009/0228157 | A1 * | 9/2009 | Breed | 701/1 |
| 2011/0006914 | A1 * | 1/2011 | Tsuda | H04W 16/30 340/905 |
| 2011/0170004 | A1 * | 7/2011 | Nunes | H04H 20/61 348/500 |

FOREIGN PATENT DOCUMENTS

| | | | | |
|---|---|---|---|---|
| DE | 102007037162 | | 2/2009 | |
| WO | WO 92/19811 | * | 11/1992 | ............ E01C 23/16 |
| WO | WO09219811 | | 11/1992 | |

OTHER PUBLICATIONS

Roof Rack Mount Track Tire Transport published at http://forums.rennlist.com/rennforums/racing-and-drivers-education-forum/187432-roof-rack-mount-track-tire-transport.html by JackOlesn.*
Google Street View in Hunters point, Queens published http://commons.wikimedia.org/wiki/File:Google_Street_View_Car_in_Hunters_Point,_Queens.jpg on Jun. 27, 2009 by Wikimedia.*
Google Street Car published at http://commons.wikimedia.org/wiki/File:GoogleStreetViewCar.jpg on Jun. 30, 2008 by Wikimedia.*
Google Street View:Capturing the World At Street Level, Dragomir Anguelov et al., Published by the IEEE Computer Society, Jun. 2010, pp. 32-35.*
Austrian Official Action for A-355-209 dated May 11, 2010.
ISA Written Opinion for PCT/AT2010/000280 dated Jun. 28, 2011.
International Search Report for WO 2011/022741 A1 dated Jan. 23, 2010.
"Mobile Lidar Mapping for Urban Data Capture," Haala et al., Institute for Photogrammety (ifp), Universitaet Stuttgart, Germany, six (6) pages.
"Mapping with Mobile Lidar," Archive, Apr. 2009, vol. 23, Issue 4, three (3) pages.
"Updating a Digital Geographic Database Using Vehicle-borne Laser Scanners and Line Cameras," Zhao et al., Photogrammetric Engineering & Remove Sensing, vol. 71, No. 4, Apr. 2005, pp. 415-424.
"Geometric validation of a ground-based mobile laser scanning system," Barber et al., ISPRS Journal of Photogrammetry & Remote Sensing 63, (2008) pp. 128-141.
International Preliminary Report on Patentability for PCT/AT2010/000280 dated Mar. 15, 2012.

* cited by examiner

LASER SCANNING DEVICE FOR MOUNTING ON THE ROOF RACK OF A VEHICLE

CROSS-REFERENCE TO RELATED APPLICATIONS

This application is a National Phase application of International Application No. PCT/AT2010/000280 filed Jul. 30, 2010 which claims priority to Austrian Patent Application No. A 1355/2009 filed Aug. 28, 2009 the disclosures of which are incorporated herein by reference.

BACKGROUND

The present invention pertains to a laser scanning device for mounting on the roof rack of a vehicle.

Laser scanning devices on vehicles are known, for example from DE 10 2007 037 162 A1 and are used for ground terrain mapping by means of a method known as Mobile Scanning or Mobile Mapping. In this method, the topography of the landscape is detected from a moving ground or water vehicle that bears the laser scanner. Mobile scanning systems are significantly lower in cost than airborne or satellite-based survey systems and moreover, can detect regions inaccessible to aerial survey, for example, road intersections, water routes, tunnels, mining structures etc.

The mounting of a laser scanning device on a mobile scanning vehicle is subject to several requirements. Firstly, the mounting should be as high as possible because the laser scanning might otherwise be impacted negatively by vehicles parked on the side of the road. But secondly, it also should be only high enough so that the system can travel under lines, bridges and through tunnels unimpeded. The air resistance of the vehicle should not be unduly increased, and when not in use, the laser scanning device should be dismountable for storage. Finally, it must be taken into account that mobile scanning systems when populated with several laser scanners can attain a considerable weight of up to 100 kg, which places corresponding requirements on their stability and handling.

At present, there are no laser scanning devices that satisfactorily conform to these requirements. Indeed, laser scanning devices of the kind discussed above are known that are mounted on the conventional roof rails of the vehicle, however, these devices can only be set as a unit onto the vehicle from above and owing to their size and weight, they are exceptionally difficult in handling.

SUMMARY

The objective of the invention is to overcome the disadvantages of the known prior art and to create a laser scanning device of the kind described above that satisfies equally all the named requirements. This objective is attained with a laser scanning device of the kind described above that is characterized according to the invention by a base support configured in the shape of an "X" for mounting on the roof rack and on which a laser scanning module that spans the fork of the "X" can be fixed.

The construction in the shape of an "X" according to the invention produces an exceptionally stable, torsionally resistant anchoring to the vehicle roof. Most varied kinds of laser scanners can be aligned in parallel to the arms of the "X" in a slant position at the corners of the vehicle, which produces a high static and dynamic stability. In addition, the base support can be left in its mounted position on the vehicle roof support and the laser scanning module can be easily removed for transport and storage.

According to one particularly preferred embodiment of the invention, the laser scanning module comprises a substantially triangular or trapezoidal-shaped laser scanner support and a 2D-laser scanner is mounted on each of the two sides thereof. Thus the laser scanning module with its contact forces is fitted precisely to the "X"-shaped laser scanner support.

In the present description, the term "2D-laser scanner" means a laser scanner, whose laser scanning beam moves only within one single scanning plane, that is, one single beam fan is emitted toward the environment in order to produce a 2D-profile of the environment from the reflection, which corresponds to the line of intersection of the scanning plane with the environmental relief. Due to the progression of the vehicle in a direction away from the scanning plane, a 3D-image of the environment can be produced from several successive 2D-profiles.

Preferably the 2D-laser scanners are 360°-2D-laser scanners. By the term "360°-2D-laser scanner" in the present description, a 2D-laser scanner is meant, whose laser scanning beam rotates by a full 360° in the scanning plane.

Due to the invented arrangement of two 360°-2D-laser scanners at the sides of a triangular or trapezoidal-shaped laser scanner support, the scanning planes of said laser scanners can be arranged directly at the upper rear corners of the vehicle and thus can be directed so that they do not come into contact with any part of the vehicle.

This arrangement also affords the possibility of tipping the upper halves of the scanning planes of the two 360°-2D-laser scanners to the direction of travel, without them being obstructed by parts of the vehicle.

It is particularly advantageous when 2D-laser scanners can be locked in different, selected angular positions on the laser scanner support to be able to adapt the device to different mounting situations and applications.

An additional, favorable embodiment of the invention provides that the laser scanner support bear an additional 3D-laser scanner on the upper side thereof. In this manner, the laser scanner support can be modularly populated with different kinds of laser scanners.

In the present description, a "3D-laser scanner" is understood to mean a laser scanner whose laser scanning beam can be directed in any particular direction, e.g. by rotation of a beam fan around an additional axis, so that even with the vehicle stopped, a 3D-image of the environment can be produced.

If an optional 3D-laser scanner is used together with two 360°-2D laser scanners tipped in the travel direction, it is particularly advantageous when the two 360°-2D-laser scanners are offset to the rear with respect to the 3D-laser scanner so that their scanning planes pass the 3D-laser scanner unhindered.

According to an additional preferred feature of the invention, the laser scanner support is a housing with a substantially triangular or trapezoidal-shaped cross section. A housing of this kind presents at its walls favorably positioned interfaces for modular attachment of different kinds of laser scanners, wherein the slant position of the side surfaces can be utilized for the slant positioning of the laser scanners.

Preferably, a housing of this kind can also be used simultaneously to accommodate an inertial measuring device and a satellite navigation device. Thus, the housing can support preferably at its upper side—or at the upper side of any particular carried 3D-laser scanner—an antenna for the satellite navigation device.

In any case it is favorable when, according to an additional preferred feature of the invention, the laser scanner module is detachably anchored to the base support by means of a fast-acting coupling. Thus the laser scanning module, when not in use, can be quickly and easily dismounted.

In this regard, it is particularly favorable when the fast-acting coupling can be closed by sliding the laser scanner module in a substantially horizontal direction into a guide. This promotes the handling of the laser scanning module—which can attain considerable weight—when mounting on and dismounting from the roof support of the vehicle.

Preferably, the fast-acting coupling features a retaining bolt that can be inserted into flaps of a bearing plate of the base support, which produces a particularly stable anchoring.

According to an additional preferred feature of the invention, the laser scanner module can bear at least one camera for photographic recording of the vehicle environment.

Finally, it is also particularly favorable when the laser scanner module has a common connection for all its electrical components, so that they can all be connected to the vehicle's internal power supply and/or to external instruments, by closing a single electrical contact, for instance, which further promotes a simplified handling.

BRIEF DESCRIPTION OF THE DRAWINGS

The invention will be explained in greater detail below based on exemplary embodiments represented in the attached drawings. The drawings show.

DETAILED DESCRIPTION

Figure 1:
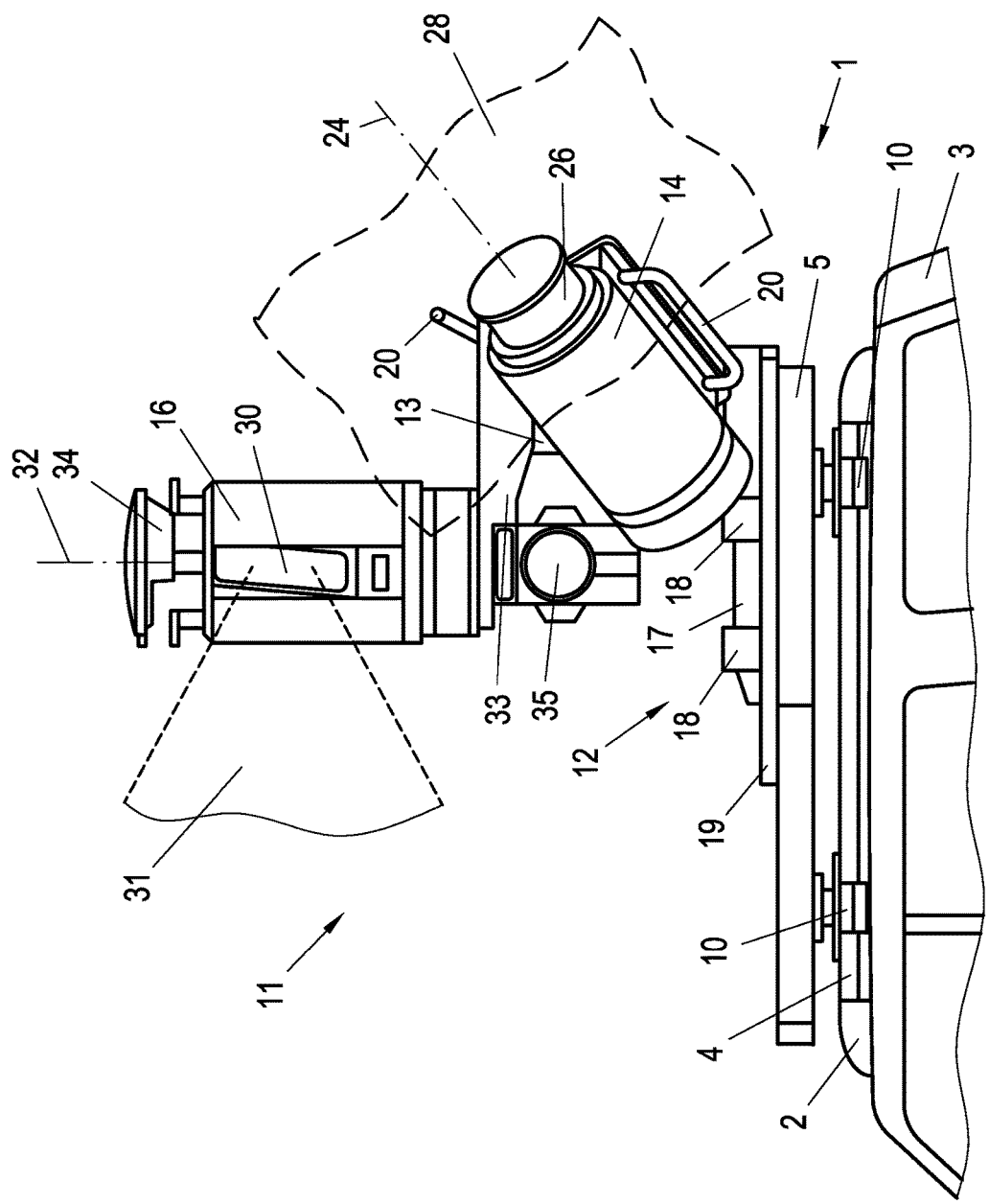
FIGS. 1 and 2: The invented laser scanning device in the mounted position on a vehicle, in side view and top view.
Figure 2:
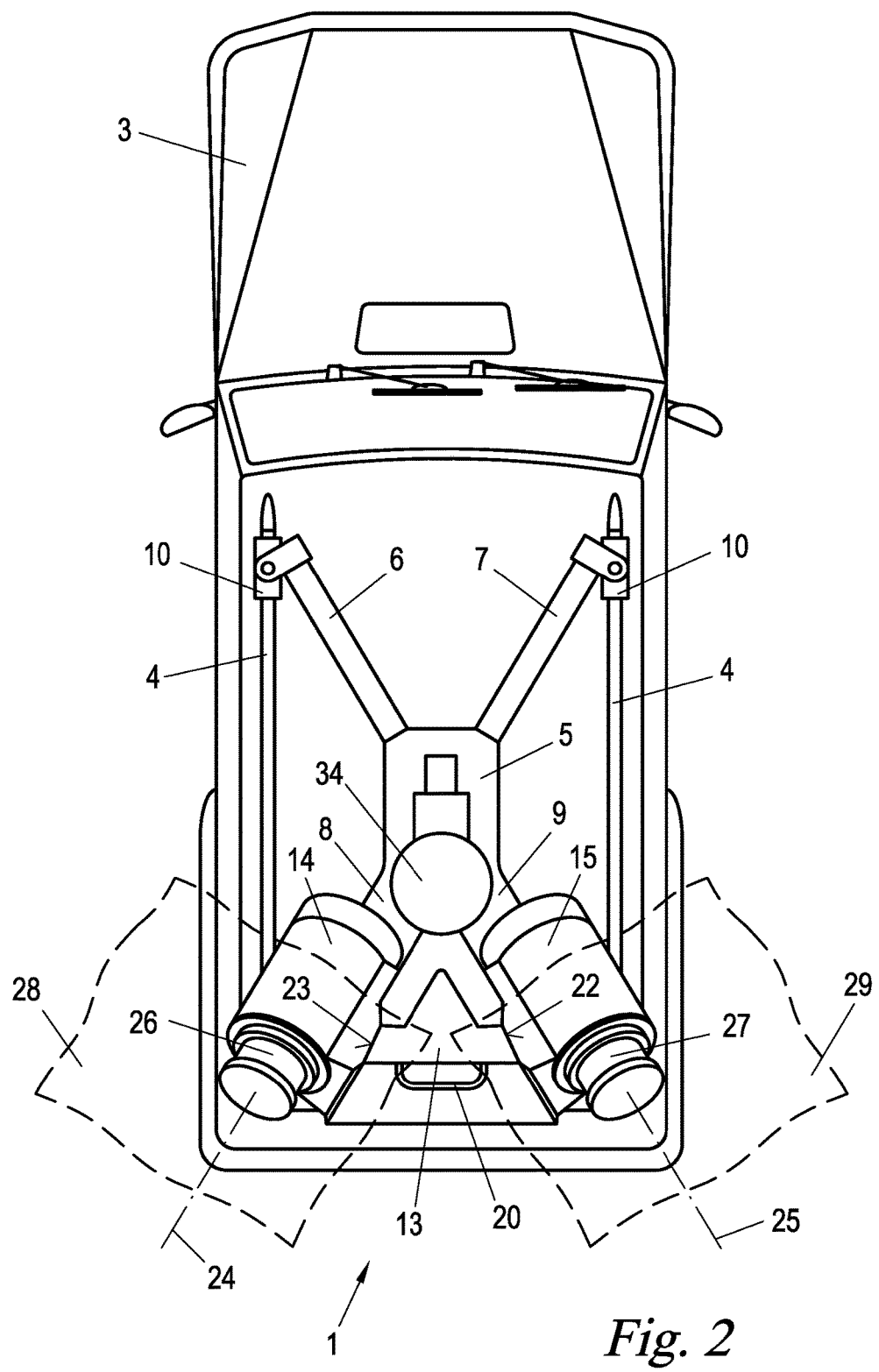
Figure 3:
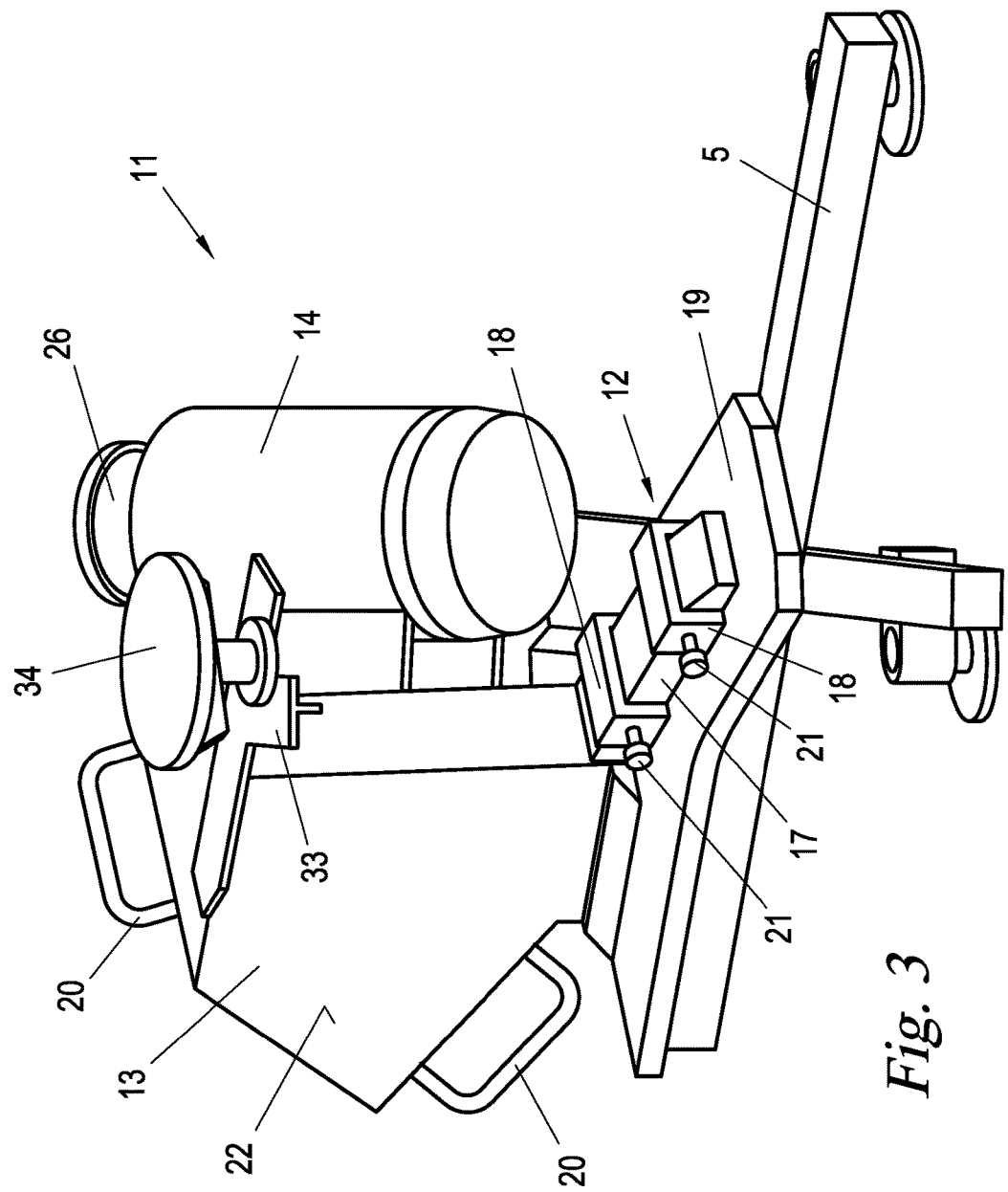
FIG. 3: The laser scanning device of FIG. 1 presented in a slanted view, wherein one of the two side laser scanners was removed for better illustration.

A laser scanning device 1 for mounting on the roof support 2 of a vehicle 3 is shown in FIGS. 1-3. The roof support 2 is, for example, a conventional passenger vehicle roof support in the form of two roof rails 3, 4.

The laser scanning device 1 comprises a base support 5 in the shape of an "X" whose four "X"-arms 6-9 are each securely clamped by a clamp 10 to the roof rails 3, 4. A laser scanner module 11 is mounted on the base support 5 in one of the forks between the two rear "X"-arms 8, 9, and by using fast-acting coupling 12.

The laser scanning module 11 is composed of a substantially triangular or trapezoidal laser scanner support 13 that bears the fast-acting coupling 12 on its underside, and different kinds of laser scanners 14-16 on its sides and on its upper side.

In the illustrated example, the laser scanner support 13 is formed by a box-like housing with—when seen from above—a substantially trapezoidal-shaped cross section, having in the interior an inertial measurement unit (IMU) and a satellite navigation device (global navigation satellite system, GNSS) that are used to determine the path and orientation of motion (the "trajectory") of the laser scanner module 11 and can serve as a reference for the laser scanner data, as known to the ordinary person skilled in the art.

The fast-acting coupling 12 can be designed in any manner known from engineering, for example, as a bayonet or snap-coupling, or as a dovetail guide with snap pawls. In the illustrated example, the fast-acting coupling 12 is a sliding guide for a retaining bolt 17 emerging from the base of the laser scanner support 13, and said bolt can be inserted horizontally into flaps 18 of a bearing plate 19 of the base support 5.

The laser scanner support 13 can be equipped with handles 20 that are used to lift the device to the level of the automobile roof and then are inserted horizontally into the flaps 18, which simplifies the assembly. The laser scanner module 11 is mounted on the base support 5 by means of corresponding snap pawls, pins or screws 21 that engage into the flaps 18 or into the bearing plate 19.

The laser scanner module 11, in particular the housing of the laser scanner support 13, is equipped preferably with a single, common electrical connection, e.g. with a multi-pin plug connector, for contacting of all its electronic components.

The laser scanners 14, 15 mounted on the two sides of the laser scanner support 13 are preferably 360°-2D-laser scanners that are additionally positioned at a slant for mounting on the side surfaces 22, 23 of the laser scanner support 13, such that their axis of rotation 24, 25 can be tipped upward, downward and outward with respect to the vehicle 3. The 360°-2D-laser scanners 14, 15 can be locked, preferably in different, variable angular positions, to the side surfaces 22, 23 of the laser scanner support, for example, by means of a perforated raster in the side surfaces 22, 23 for corresponding assembly screws of the laser scanners 14, 15. Alternatively, the 360°-2D-laser scanners 14, 15 can be mounted by means of corresponding pivot or rotary-bearings so as to pivot at an angle to the laser scanner support 13, e.g. by means of a lockable swivel head on the side surfaces of the laser scanner support 13.

Each of the 360°-2D-laser scanners 14, 15 each features a scanner head 26, 27 with a 360°-perimeter outlet window for a rotating laser scanning beam, so that each can scan its environment in one single scanning plane 28, 29. One example of this kind of 360°-2D-laser scanner is a product known under the tradename VQ® 250 by the firm of RIEGL Laser Measurement Systems GmbH, in Horn, Austria.

As is evident from FIGS. 1 and 2, the upper halves of the scanning planes 28, 29 are tipped toward the direction of travel and the lower halves of the scanning planes 28, 29 are tipped away from the vehicle, and also the outer halves of the scanning planes 28, 29 are tipped toward the direction of travel and the inner halves of the scanning planes 28, 29 are tipped away from the direction of travel. Thus the scanning planes 28, 29 of the 360°-2D-laser scanners 14, 15 do not come into contact with any vehicle parts at all and can scan the travel environment unimpeded.

On its top side, the laser scanner support 13 can support an optional 3D-laser scanner 16. The 3D-laser scanner 16 emits an entire fan of laser beams 31 through a slotted outlet window 30 and in addition can rotate about its vertical axis 32 in order to produce a 3D-image of the environment. One example of this kind of 3D-laser scanner is a product known under the tradename VZ® 400 by the firm of RIEGL Laser Measurement Systems GmbH in Horn, Austria.

The 360°-2D-laser scanners 14, 15 are offset to the rear with respect to the 3D-laser scanner 16, for example, by shifting the latter forward on a cantilever 33 toward the upper side of the housing 13, so that the scanning planes 28, 29 can pass the 3D-laser scanner 16 unobstructed.

An antenna 34 for the satellite navigation device can be arranged at the top side of the 3D-laser scanner 16, or—if no 3D-laser scanner 16 is used—at the top side of the laser scanner support 13. Furthermore, one or several cameras 35 can be mounted on the sides of the laser scanner module 11, e.g. directly on the laser scanner support 13 or on the cantilever 33, for photographic recording of the vehicle environment.

Figure 4:
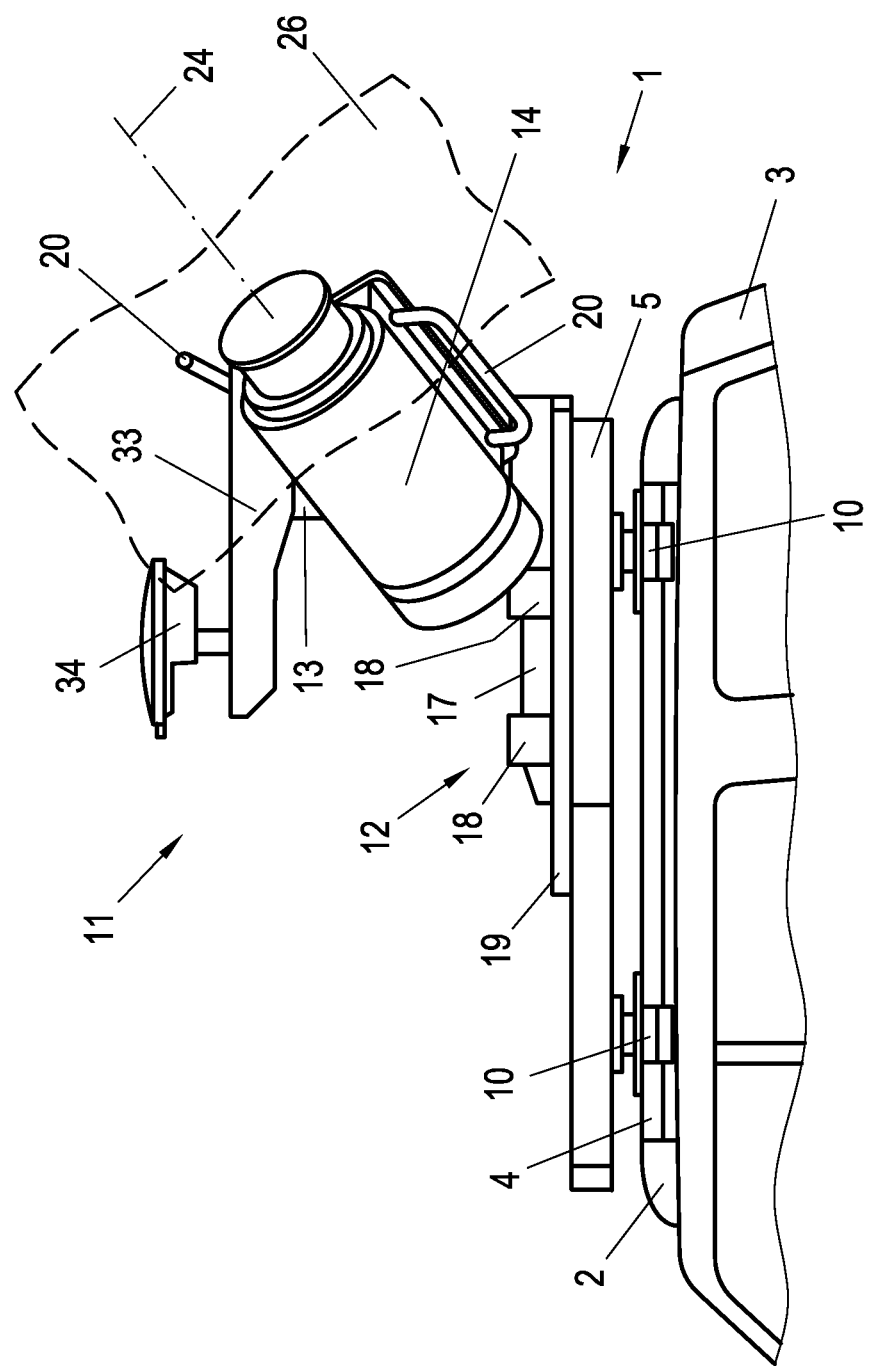
FIG. 4: An additional embodiment of the laser scanning device of the invention, presented in side view.

FIG. 4 shows an alternative embodiment of the device 1 with a simplified laser scanner module 11 that displays only two lateral 360°-2D-laser scanners 14, 15, but no upper 3D-laser scanner 16 and not even any cameras 35. In this case, the antenna 34 is mounted directly on the cantilever 33 or to the top side of the laser scanner support 13.

The invention is not limited to the illustrated embodiments, but rather covers all variants and modifications that fall within the scope of the attached claims.

What is claimed is:

1. A laser scanning device for mounting on a roof rack of a vehicle, comprising a base support configured in the shape of a substantially flat "X" having four arms meeting a common, central apex, each arm including a clamp for mounting the base support to the vehicle roof rack, each adjacent two arms forming a fork therebetween, a laser scanning module removably mounted on the base support, wherein the laser scanning module is mounted to transversely span only one of the forks of the "X" shaped base support.

2. The laser scanning device according to claim 1, wherein the laser scanning module comprises a laser scanner support mounted on the base support and at least two 2D-laser scanners mounted on the laser scanner support such that the scanners are substantially aligned with the fork on which the laser scanner module is mounted when viewed from above the laser scanning module.

3. The laser scanning device according to claim 2, wherein the 2D-laser scanners are 360°-2D-laser scanners.

4. The laser scanning device according to claim 3, wherein the upper halves of the scanning planes of the two 360°-2D-laser scanners are tipped to the direction of travel.

5. The laser scanning device according to claim 2, wherein the 2D-laser scanners can be locked in different, selected angular positions on the laser scanner support.

6. The laser scanning device according to claim 2, wherein the laser scanner support bears an additional 3D-laser scanner on the upper side thereof.

7. The laser scanning device according to claim 6, wherein the two 360°-2D-laser scanners-are offset to the rear with respect to the 3D-laser scanner so that their scanning planes pass the 3D-laser scanner unhindered.

8. The laser scanning device according to claim 2, wherein the laser scanner support is a housing with a substantially triangular or trapezoidal-shaped cross section.

9. The laser scanning device according to claim 8, wherein the housing accommodates an inertial measuring device and a satellite navigation device.

10. The laser scanning device according to claim 9, wherein the housing bears on the upper side thereof an antenna for the satellite navigation device.

11. The laser scanning device according to claim 1, wherein the laser scanner module is detachably anchored by a fast acting coupling to a bearing plate mounted on the base support.

12. The laser scanning device according to claim 11, wherein the fast-acting coupling can be closed by sliding the laser scanner module in a substantially horizontal direction into a guide.

13. The laser scanning device according to claim 12, wherein the fast-acting coupling features a retaining bolt that can be inserted into flaps provided on the bearing plate.

14. The laser scanning device according to claim 1, wherein the laser scanner module bears at least one camera for photographic recording of the vehicle environment.

15. The laser scanning device according to claim 1, wherein the laser scanner module features a common connection for all the electrical components thereof.

16. The laser scanning device according to claim 9, wherein an upper side of a 3D-laser scanner has supported thereon an antenna for the satellite navigation device.

17. A laser scanning device for mounting to conventional rails of a roof rack on a vehicle, comprising:
    an x-shaped base support wherein each corner of the x-shaped base support is clamped to a longitudinal roof rack rail of the vehicle and a laser scanning device removably mounted on the base support, the base support comprising two substantially flat v-shaped forks which meet at a common, central apex, the laser scanning device being mounted to transversely span only one of the v-shaped forks of the base support.

18. The laser scanning device according to claim 17, wherein the base support includes a bearing plate having a fast-acting coupler thereon to removably mount the laser scanning device thereto.

19. The laser scanning device according to claim 17, wherein the laser scanning device is mounted to the v-shaped fork at a rearward end of the vehicle.

20. The laser scanning device according to claim 17, further comprising a laser scanner support and two 360°-2D laser scanners mounted on the sides of the laser scanner support and substantially aligned with the v-shaped fork when viewed from above the laser scanning device and wherein the scanning planes of the laser scanners are arranged at the upper rear corners of the vehicle and directed so that scanning planes of the 2D laser scanners do not come in contact with any part of the vehicle.

* * * * *